United States Patent [19]

Komatsu et al.

[11] Patent Number: 4,873,288

[45] Date of Patent: Oct. 10, 1989

[54] METHOD FOR PREPARATION OF THERMOPLASTIC RESIN COMPOSITION

[75] Inventors: Masato Komatsu; Isao Baba, both of Saitama; Takashi Mikami, Tokyo; Kiyotada Narukawa, Saitama; Tsuyoshi Kanai, Kanagawa, all of Japan

[73] Assignee: Toa Nenryo Kogyo K.K., Tokyo, Japan

[21] Appl. No.: 253,178

[22] Filed: Oct. 4, 1988

[30] Foreign Application Priority Data

Oct. 7, 1987 [JP] Japan ................. 62-253308

[51] Int. Cl.$^4$ ............ C08L 23/26; C08L 15/02; C08L 23/10
[52] U.S. Cl. ........................ 525/194; 525/192; 525/193; 525/195; 525/196; 525/197; 525/198; 525/232; 525/237; 524/525
[58] Field of Search .......... 525/194, 232, 197, 237, 525/195

[56] References Cited

U.S. PATENT DOCUMENTS

| | | | |
|---|---|---|---|
| 3,806,558 | 4/1974 | Fischer | 260/897 |
| 4,212,787 | 7/1980 | Matsuda | 260/33.6 |
| 4,247,652 | 1/1981 | Matsuda | 521/95 |
| 4,607,074 | 8/1986 | Hazelton et al. | 525/194 |

FOREIGN PATENT DOCUMENTS 54-23702  8/1979  Japan.

OTHER PUBLICATIONS

Copy of Abstract from Japanese Patent Publication JP-A-6250354, Exxon Kagaku K.K., Tonen Sekiyu Kagaku K.K.
PCT/US87/00446, Method of Manufacture of Thermoplastic Elastomer Compositions, M. Komatsu et al., International Filing Date Mar. 3, 1987, International Publication Number WO87/05308 and Supplement.

*Primary Examiner*—Carman J. Seccuro
*Attorney, Agent, or Firm*—H. L. Cohen

[57] ABSTRACT

A two-step process for production of thermoplastic elastomer, which comprises dynamically vulcanizing polypropylene and olefinic rubber in the presence of peroxide (1st step), and dynamically vulcanizing the vulcanized mixture, polypropylene and halogenated butyl rubber in the presence of zinc oxide (2nd step). In another method (a) polyolefin and olefin rubber are dynamically cross-linked in the presence of an organic peroxide and (b) in a separate second operation a dynamically vulcanized blend comprising polyolefin and halogenated butyl rubber is prepared and mixed with (a) to disperse (a) and (b) in one another. The thermoplastic elastomer composition is useful in materials for parts of automobiles.

In an example, pp 9 wt. % parts, EPDM 21 wt. % parts, peroxide 0.3 wt. % part and divinylbenzene 0.5 wt. % part were blended and supplied to the first hopper (1) of biaxial extruder as shown in a figure. In the first blending zone (2), temperature and residence time are 200° C. and 60 seconds respectively. And then, to the second hopper (3) of the extruder, pp 50 parts and the vulcanized product (EPDM+chlorinated butyl rubber) 20 parts were supplied and extruded in the heat blending zone (4) above mentioned mixture for 30 seconds of residence time. The physical properties of the composition are MFR: 18, Flex. Mod.: 3,300 (23° C.) and 1,150 (80° C.), Tens. at break: 105, Elong.: 420%, Izod.: No break (room temperature) and 25 (−40° C.) Shore-D: 58, Flow marks: good and paintability: 100/100.

9 Claims, 1 Drawing Sheet

4,873,288

METHOD FOR PREPARATION OF THERMOPLASTIC RESIN COMPOSITION

BACKGROUND OF THE INVENTION

The present invention relates to a method for preparation of a thermoplastic resin composition with good impact-resistance and, in particular, to a method for preparation of a thermoplastic resin composition containing two different crosslinked rubbers uniformly dispersed in a polyolefin phase, preferably polypropylene.

A thermoplastic elastomeric composition comprising a polyolefin and a partially crosslinked rubber component has excellent properties, such as heat-resistance, mechanical strength, softness and elasticity, and such compositions are being widely utilized for formation of large-sized shaped articles such as bumpers for cars.

Regarding thermoplastic elastomers of this type, JP-B-No. 53-34210 (the term "JP-B" as used herein means an "examined Japanese patent publication") illustrates a thermoplastic blend formed by dynamically partially curing from 60 to 80 parts by weight of a monoolefin copolymer rubber and from 40 to 20 parts by weight of a polyolefin plastic. The thermoplastic blend may be obtained by mixing the said components together with a curing agent and dynamically mixing them at the curing temperature to cure the same.

In addition, there were proposed, for example, a partially crosslinked composition comprising a polyolefin and two kinds of rubber compositions (JP-B-No. 54-23702), a partially crosslinked composition obtained by incorporating a polyolefin into a composition formed by processing a polyolefin and a rubber component in the presence of an organic peroxide (JP-B-No. 56-15743), and a method for preparation of the said composition (JP-B No. 56-15740).

However, organic peroxides to be used in the preparation of the above-mentioned partially crosslinked thermoplastic elastomer composition as a crosslinking agent are too strongly reactive so that it is difficult to control the crosslinking degree in the composition. Moreover, there are still other problems that the physical properties of the crosslinked composition would be reduced because of the cleavage of molecular chains following crosslinking in the composition. The resulting low molecular weight substances would have a bad influence on the coatability of the composition, and additionally the shaped article from the composition would have a rough surface because of the partial gelation in the composition. In addition, free radicals may be present in the shaped article because of the organic peroxide used so that the heat stability of the article would lower. This is still another problem.

In order to overcome these problems, JP-A-No. 62-50354 (the term "JP-A" as used herein means an "unexamined published Japanese patent application") illustrates an olefin soft resin composition obtained by hot-melting and mixing a mixture comprising (A) from 10 to 90 parts by weight of a polypropylene, (B) from 90 to 10 parts by weight of a halogenated butyl rubber (provided that (A)+(B)=100 parts by weight), (C) from 10 to 120 parts by weight of an olefin rubber and (D) from 5 to 120 parts by weight of a mineral oil softening agent in the presence of (E) a metal oxide and/or a metal chloride and then uniformly incorporating (F) a polyolefin into the said blend.

However, it has been found that the composition of JP-A-No. 62-5054 is still insufficient with regard to properties which are required for bumpers or the like parts of cars, though the composition has fairly good shapeability, impact-strength, coatability, softness and mechanical strength.

Accordingly, the object of the present invention is to provide a method of preparing a thermoplastic resin composition having more improved physical properties with respect to the above-mentioned points.

SUMMARY OF THE INVENTION

A method for preparation of a thermoplastic resin composition comprising from 80 to 60% by weight of polyolefin and from 20 to 40% by weight of crosslinked olefin rubber and further comprising halogenated butyl rubber in an amount of from 5 to 30 parts by weight to 100 parts by weight of the total of said polyolefin and said crosslinked olefin rubber, characterized in that (a) a first blend of polyolefin and crosslinkable olefin rubber are dynamically heat-treated in the presence of an organic peroxide to form a dynamically vulcanized composition, and (b) polyolefin and halogenated butyl rubber and a crosslinking agent for said halogenated butyl are added to said first blend and dynamically heat-treated so as to crosslink said halogenated butyl rubber.

Alternatively, the first and second blend components can be independently prepared and blended with one another. Preferably, the halogenated butyl is chlorobutyl or bromobutyl and the crosslinking agent therefor is a metal oxide such as zinc oxide. The resulting composition has improved physical properties and is particularly useful as automotive parts.

DETAILED DESCRIPTION OF THE INVENTION

Figure 1:
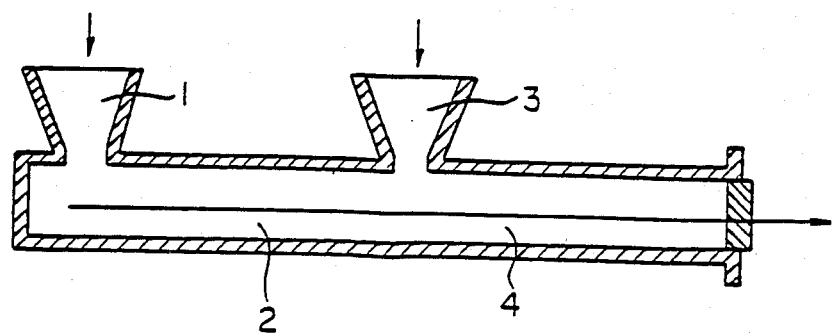
FIG. 1 shows an outline of a biaxial extruder useful for performance of the method of the present invention, in which (1) is a first hopper, (2) is a first mixing zone, (3) is a second hopper and (4) is a second mixing zone.

The present inventors earnestly studied the above-mentioned problems and as a result have found that a thermoplastic resin composition which is excellent in the above-mentioned properties may be obtained by first crosslinking a mixture of a polyolefin such as polypropylene and a crosslinking olefin rubber in the presence of an organic peroxide and then blending a halogenated butyl rubber and polypropylene into the resulting mixture and crosslinking the halogenated butyl rubber in the presence of a metal oxide and/or a metal halide, or blending a mixture of cross-linked halogenated butyl rubber and polypropylene into the first mixture. Accordingly, the present inventors have achieved the present invention.

Precisely, the first method of the present invention for preparation of a thermoplastic resin composition is characterized in that (a) polypropylene and crosslinkable olefin rubber are dynamically heat-treated in the presence of an organic peroxide to form a mixed blend, and (b) polypropylene and halogenated butyl rubber and a crosslinking agent for the halogenated butyl rubber, e.g., metal oxide and/or metal chloride, are added to the blend from (a) and dynamically heat-treated so as to crosslink the halogenated butyl rubber.

The second method of the present invention for preparation of a thermoplastic resin composition is characterized in that (a) polypropylene and a cross-linking olefin rubber are dynamically heat-treated in the presence of an organic peroxide to form a first mixed blend, and (b) a second blend comprising polypropylene and halogenated butyl rubber crosslinked with e.g., a metal oxide and/or metal chloride is added to the first blend and mixed.

The materials to be used in the method of the present invention for preparation of a thermoplastic resin composition are described below.

(A) Polyolefin

The polyolefin, preferably polypropylene, for use in the present invention is a homopolymer of propylene or a random or block copolymer consisting essentially of a propylene copolymer copolymerized with an alpha-olefin such as ethylene, 1-butene, 1-pentene, 1-hexene or 4-methyl-1-pentene. The melt flow rate (MFR) is from 0.3 to 80 g/10 min, preferably from 3 to 70 g/10 min, more preferably from 15 to 70 g/10 min.

The polyolefin component, in particular poly-propylene, has a function for improving the heat-resistance and the mechanical strength of the thermoplastic resin composition.

(B) Crosslinkable Olefin Rubber

This includes copolymer rubbers made of two or more monoolefins such as ethylene, propylene, 1-butene, 1-hexene and/or 4-methyl-1-pentene (typically, ethylenepropylene copolymer rubber), as well as copolymer rubbers made of two of the above-mentioned monoolefins (ethylene and propylene are preferred) and a non-conjugated diolefin such as dicyclopentadiene, 1,4-hexadiene, cyclooctadiene, methylenenorbornene or ethylidene- norbornene or a conjugated diolefin such as butadiene or isoprene. This further includes polyisoprene and nitrile rubber. The olefin rubber preferably has a Mooney viscosity ML1+8 (127° C.) of from 5 to 300, an iodine value of 30 or less and an ethylene content of from 35 to 85% by weight.

The crosslinked olefin rubber component exists in the composition as a partially crosslinked rubber and improves the heat-resistance properties, the mechanical strength, the impact-strength and the softness of the composition.

(C) Halogenated Butyl Rubber

This means a halogenated isobutylene-isoprene copolymer rubber. The proportion (molar ratio) of isobutylene to isoprene in the copolymer is generally 99.5/0.5 to 96/4.

Halogens useful in the present invention include chlorine and bromine, and the halogen content is generally from about 0.5 to about 4.0% by weight. The halogenated butyl rubber preferably has a Mooney viscosity ML1+8 (100° C.) of from 30 to 100, and unsaturation preferably from about 0.5 to about 4.0 mol %.

The halogenated butyl rubber component is a rubber which may be crosslinked with a metal oxide or metal chloride. After crosslinking, it is dispersed in the composition as a crosslinked rubber, which functions to improve the abrasion-resistance and scratch-resistance, the heat-resistance, the oil-resistance, the rubber elasticity, the gas-impermeability and the slipping resistance.

(D) Organic Peroxide

Organic peroxides to be used for crosslinking olefin rubbers are those having a half-life temperature of from about 160° to about 220° C., which include, for example, di-tert-butylperoxide, dicumylperoxide, benzoylperoxide, 2,5-dimethyl-2,5-di(tert-butylperoxy)hexyne-3, 2,5-dimethyl-2,5-di(tert-butylperoxy)-hexane, etc.

For partial crosslinking of the olefin rubber with the above-mentioned peroxide, it is desired that a crosslinking aid such as p,p'-dibenzoylquinone-dioxime or divinylbenzene is used.

The organic peroxide acts to partially crosslink the crosslinking olefin rubber thereby to improve the high temperature strength of the composition. The crosslinking aid acts to uniformly and mildly conduct the crosslinking reaction.

(E) Metal Oxide, Metal Chloride

The metal oxide for use in the present invention, includes zinc oxide, magnesium oxide, lead oxide and calcium oxide, and zinc oxide is preferred.

The metal chloride for use in the present invention, includes zinc chloride and tin chloride. In order to prevent the mould and other devices from being corroded by a free halogen during the process, it is desired to use magnesium oxide as a halogen-inactivating agent.

In addition, the following components are preferably incorporated into the composition of the present invention.

(F) Mineral Oil Softening Agent

This is a high boiling point petroleum fraction which is to be used for the purpose of lowering the hardness of the vulcanized rubber and of increasing the softness and elasticity. As examples, there are paraffinic, naphthenic and aromatic mineral oils. In particular, paraffinic and naphthenic mineral oil softening agents are preferred for use in coating compositions, since these do not have a negative influence on the coatability of the compositions.

(G) Others

In addition to the above-mentioned components, the composition of the present invention may further contain stabilizers such as antioxidants; ultraviolet absorbents and rust inhibitors for metals; additives such as lubricants, antistatic agents; electrical characteristic-improving agents; flame-retardants; processibility-improving agents and pigments; as well as inorganic fillers such as talc, calcium carbonate, barium sulfate and calcium silicate.

The manufacturing process of the thermoplastic resin composition of the present invention is as follows:

(1) First Step

Polyolefin, preferably polypropylene, and a crosslinkable olefin rubber are dynamically heat-treated in the presence of an organic peroxide and optionally a cross-linking aid to crosslink the olefin rubber. The dynamic heat-treatment is preferably conducted by mixing the components in an extruder or the like at 170° to 220° C. The mixing time (residence time) is from 30 to 120 seconds, preferably from 60 to 120 seconds.

When the subsequent second step is carried out continuously, an extruder having two feed ports (hoppers) is used. The extruder has, as shown in FIG. 1, a first hopper (1), a first mixing zone (2), a second hopper (3), and a second mixing zone (4). The above-mentioned materials as fed from the first hopper (1) are mixed in the first mixing zone, whereupon the condition is to be so defined that almost all the organic peroxide is to be consumed in the said first mixing zone (2) in order that any remaining organic peroxide would not act to decompose the halogenated butyl rubber to be fed from the second hopper (3).

The polypropylene to be used in the first step is from 3 to 15% by weight on the basis of the final thermoplastic resin composition (hereinafter referred to as "final product"), and the crosslinking olefin rubber is from 5 to 30% by weight on the basis of the final product. The organic peroxide is added in a proportion of from 1 to 4 parts by weigh to 100 parts by weight of the crosslinkable olefin rubber. As a preferred range of the respective components, the polypropylene is from 3 to 10% by weight, the crosslinking olefin rubber is from 5 to 20% by weight, and the organic peroxide is from 1.5 to 4 parts by weight to 100 parts by weight of the crosslinking olefin rubber.

(2) Second Step

Polyolefin, preferably polypropylene, halogenated butyl rubber and metal oxide or metal chloride are fed into the extruder of FIG. 1 from the second hopper (3) so that these are mixed together with the blend from the first mixing zone (2). In this step, the halogenated butyl rubber is crosslinked with the metal oxide and/or metal chloride, since almost all the organic peroxide as fed from the first hopper (1) was consumed in the first step. Regarding the dynamic heat-treatment in the second step, the heating temperature is generally from 170° to 220° C. and the residence time is from 30 to 120 seconds. Preferably, the heating temperature is from 180° to 200° C., and the residence time is from 30 to 60 seconds.

In the second step, a crosslinking olefin rubber may be added in addition to the above-mentioned components, and a mineral oil softening agent may also be added so as to improve the softness of the resulting composition. In addition, a rubber which may be decomposed by an organic peroxide, such as polyisoprene rubber, may also be added, and if desired, a halogen-inactivating agent, an anti-oxidant and other additives may also be added.

Regarding the amounts of the respective components in the second step, the polypropylene is from 10 to 70% by weight on the basis of the final product, the halogenated butyl rubber is from 2 to 30% by weight; and preferably, the polypropylene is from 30 to 50% by weight, and the halogenated butyl rubber is from 3 to 15% by weight. When a crosslinking olefin rubber is added, this is from 5 to 30% by weight, preferably from 5 to 15% by weight, on the basis of the final product. The mineral oil softening agent, if added, is from 2 to 15% by weight, preferably from 2 to 8% by weight, on the basis of the final product.

The metal oxide and/or metal chloride is from 20 to 40 parts by weight, preferably from 20 to 25 parts by weight, in all to 100 parts by weight of the halogenated butyl rubber.

In the second step, the polyolefin, halogenated butyl rubber and metal oxide and/or metal chloride and other additives are fed from the second hopper (3) so that these may directly be mixed together with the blend from the first mixing zone (2). Alternatively, the components for the second step are previously blended and then the resulting blend may be fed from the second hopper (3). In the latter case of previous blending the components, the respective components are weighed as indicated above and are blended in a separate extruder or Banbury ® mixer.

As still another process, a part of the polypropylene to be added and the halogenated butyl rubber are melted and mixed in the presence of a metal oxide and/or metal chloride so that the halogenated butyl rubber is crosslinked, and the resulting blend is fed into the second hopper (3) together with the balance of the polypropylene (and optionally together with a crosslinkable olefin rubber and other components, if necessary), whereby the mixture is mixed together with the first blend from the first mixing zone (2).

EXAMPLES

The present invention will be explained in greater detail with reference to the following examples.

In the examples and comparative examples, the physical properties of products were measured as mentioned below.
(1) MFR: JIS K 7210 (load 2.16 kg, 230° C.)
(2) Tensile breaking strength and tensile breaking elongation: JIS K 6301
(3) Flexural Modulus: JIS K 7203
(4) Izod Impact Strength: JIS K 7110
(5) Shore Hardness: JIS K 7215 (D method)
(6) Mouldability:
  (i) Molding Condition:
   Injection Moulding Machine (manufactured by Mitsubishi Natoco Co.), 350 MV×L 40
   Injection Moulding Temperature: 230° C.
   Injection Pressure:
    Primary pressure 800 kg/cm$^2$
    Secondary pressure 500 kg/cm$^2$
   Injection Time: 13 seconds
   Moulding Cycle: 38 seconds
   Gate: Side gate
   Moulded Body: 3 mm×100 mm×350 mm plate
  (ii) Evaluation:
   O: No flow mark.
   :Slight flow marks.
   X: Extreme flow marks.

(7) Coatability

Coating Step

A test sample was washed with a trichloroethane vapour for one minute, and then this was coated with a primer (RB-291, manufactured by Nippon Bee Chemical Co.) and baked at 100° C. for 30 minutes. Next, this was further coated with urethane paints (R-257, manufactured by Nippon Bee Chemical Co.) and baked at 100° C. for 30 minutes.

Evaluation

The thus coated sample was tested by cross-cut tape-peeling test in accordance with JIS K 5400.

Materials used in the following Manufacture Examples, Examples and Comparative Examples were as follows:

Polypropylene:
Block polypropylene having MI of 70 g/10 min and ethylene content of 7% by weight.
Ethylene-propylene-diene Copolymer (EPDM):
V-5630 manufactured by Exxon Chemical Co., having ethylene content of 65% by weight, oil content of 30 phr and Mooney viscosity of ML1+8 (127° C.) of 35.

Ethylene-propylene Rubber (EPR):
MD 806 manufactured by Exxon Chemical Co., having ethylene content of 60% by weight and Mooney viscosity ML1+8 (127° C.) of 30.

Chlorinated Butyl Rubber (CIIR):
Chlorobutyl-1066 manufactured by Exxon Chemical Co., having Mooney viscosity ML1+8 (125°) of 55.

Organic Peroxide:
Perhexyne-2,5B (2,5-dimethyl-2,5-di(t-butylperoxy) hexyne).

Crosslinking Aid:
Divinylbenzene.

Styrene-ethylene-butylene-styrene Block Copolymer (SEBS):
Kraton G 1657 manufactured by Shell Chemical Co.

Linear Low-density Polyethylene (LLDPE):
GS-381 manufactured by Nippon Unicar Co., having density of 0.92 and MI of 20 g/10 min.

MANUFACTURE EXAMPLE 1

Preparation of Crosslinked Product (1)

38 parts by weight of ethylene-propylene-diene copolymer rubber (EPDM), 14 parts by weight of chlorinated butyl rubber and 30 parts by weight of paraffinic oil (as mineral oil softening agent) were put in a Banbury mixer and melted and mixed at 130° to 140° C. for 3 minutes. Next, 18 parts by weight of polypropylene was put thereinto and continuously mixed at the same temperature. Further, 0.2 part by weight of ZnO, 0.8 part by weight of $ZnCl_2$ and 0.5 part by weight of MgO as a crosslinking agent and 0.1 part by weight of Irganox ®-1010 as an antioxidant were added to conduct the crosslinking reaction at 140° C. for 6 minutes.

The Crosslinked Product (1) thus obtained was taken out from the mixer and pelletized in a conventional manner.

MANUFACTURE EXAMPLE 2

Preparation of Crosslinked Product (2)

In the same manner as in Manufacture Example 1, Crosslinked Product (2) was prepared from the following components:

| Polypropylene | 18 parts by weight |
|---|---|
| EPDM | 14 parts by weight |
| Chlorinated Butyl Rubber | 38 parts by weight |
| Mineral Oil Softening Agent | 30 parts by weight |
| ZnO | 6 parts by weight |
| $ZnCl_2$ | 3 parts by weight |
| MgO | 1.5 parts by weight |
| Irganox-1010 | 0.1 parts by weight |

EXAMPLE 1

Nine parts by weight of polypropylene, 21 parts by weight of EPDM, 0.3 part by weight of organic peroxide (Perhexyne-2,5B) and 0.5 part by weight of crosslinking aid (divinylbenzene) were previously fully mixed in a rotary mixer, and the resulting blend was fed into the biaxial extruder having the structure as shown in FIG. 1, from the first hopper (1) into the first mixing zone (2). The mixing temperature in the first mixing zone was 200° C., and the residence time was kept to be 60 seconds. Subsequently, a mixture comprising 50 parts by weight of polypropylene and 20 parts by weight of Crosslinked Product (1) previously prepared from halogenated butyl rubber was fed into the second mixing zone (4). The residence time in the second mixing zone (4) was 30 seconds.

The MFR, flexural modulus, tensile breaking strength, tensile breaking elongation, Izod impact strength, Shore hardness, mouldability and coatability of the thermoplastic resin composition thus obtained were measured and examined. The results obtained are shown in Table 1 below.

EXAMPLES 2 TO 5

In the same manner as Example 1, except that the weight ratio of polypropylene/EPDM to be fed into the first mixing zone (2), the weight ratio of polypropylene/Crosslinked Product (1) to be fed into the second mixing zone (4) and the ratio of the resin weight in the first mixing zone to that in the second mixing zone were varied as indicated in Table 1, thermoplastic resin compositions were prepared. These were tested in the same manner as Example 1 and the results obtained are shown in Table 1.

EXAMPLES 6 AND 7

In the same manner as Examples 1 and 2, except that EPDM in the resin to be fed into the first mixing zone was replaced by EPR, thermoplastic resin compositions were prepared. These were tested in the same manner as Example 1 and the results obtained are shown in Table 1.

EXAMPLES 8 AND 12

In the same manner as Example 1, except that the Chlorobutyl Crosslinked Product (1) to be fed into the second mixing zone was replaced by the Crosslinked Product (2) having a higher chlorobutyl content, thermoplastic resin compositions were prepared. These were tested in the same manner as Example 1 and the results obtained are shown in Table 1.

EXAMPLE 13 AND 14

The proportion of the resins in the first mixing zone and the second mixing zone was varied to obtain various thermoplastic resin composition having a high rubber content. The thermoplastic resin compositions thus prepared were tested in the same manner as above, and the results obtained are shown in Table 1.

EXAMPLE 15

In the same manner as Example 1, except that a part of the polypropylene and the Crosslinked Product (2) to be fed into the second mixing zone was reduced and styrene-ethylene-butylene-styrene block copolymer (SEBS) was added in place of the reduced amount, a thermoplastic resin composition was obtained. This was tested in the same manner as above, and the results obtained are shown in Table 1.

TABLE 1

| Ingredients (wt. pts.) | Example No. | | | | | | | |
|---|---|---|---|---|---|---|---|---|
| | 1 | 2 | 3 | 4 | 5 | 6 | 7 | 8 |
| First Mixing Zone | | | | | | | | |
| PP | 9 | 6 | 3 | 9 | 3 | 9 | 6 | 9 |

TABLE 1-continued

| Ingredients (wt. pts.) | | | | | | | | |
|---|---|---|---|---|---|---|---|---|
| EPDM | 21 | 14 | 7 | 21 | 7 | — | — | 21 |
| EPR | — | — | — | — | — | 21 | 14 | — |
| Organic Peroxide | 0.3 | 0.3 | 0.3 | 0.3 | 0.3 | 0.3 | 0.3 | 0.3 |
| Crosslinking Aid | 0.5 | 0.5 | 0.5 | 0.5 | 0.5 | 0.5 | 0.5 | 0.5 |
| Second Mixing Zone | | | | | | | | |
| PP | 50 | 50 | 50 | 30 | 70 | 50 | 50 | 50 |
| Crosslinked Product (1) | 20 | 30 | 40 | 40 | 20 | 20 | 30 | — |
| Crosslinked Product (2) | — | — | — | — | — | — | — | 20 |
| SEBS | — | — | — | — | — | — | — | — |
| Physical Properties | | | | | | | | |
| MFR (g/10 min) | 13 | 14 | 14 | 9 | 16 | 12 | 13 | 10 |
| Flexural Modulus | | | | | | | | |
| 23° C. (kg/cm$^2$) | 3250 | 3200 | 3300 | 2700 | 8050 | 3300 | 3280 | 3050 |
| 80° C. (kg/cm$^2$) | 1200 | 1350 | 1500 | 900 | 4800 | 1020 | 1060 | 1280 |
| Tensile Breaking Strength (kg/cm$^2$) | 145 | 165 | 170 | 105 | 255 | 125 | 120 | 140 |
| Tensile Breaking Elongation (%) | 630 | 650 | 640 | 680 | 330 | 635 | 620 | 640 |
| Izod Impact Strength room temperature (kg-cm/cm) | NB[1] | NB | NB | NB | NB | NB | NB | NB |
| −40° C. | NB | NB | NB | NB | PB[2] | NB | NB | NB |
| Shore Hardness (Shore-D) | 58 | 59 | 59 | 54 | 80 | 57 | 59 | 55 |
| Mouldability (Flow Marks) | O | O | O | O | O | O | O | O |
| Coatability (cross-cut tape-peeling test) | 100/100 | 100/100 | 100/100 | 100/100 | 100/100 | 100/100 | 100/100 | 100/100 |

| Ingredients (wt. pts.) | Example No. | | | | | | |
|---|---|---|---|---|---|---|---|
| | 9 | 10 | 11 | 12 | 13 | 14 | 15 |
| First Mixing Zone | | | | | | | |
| PP | 6 | 3 | 9 | 3 | 12 | 3 | 9 |
| EPDM | 14 | 7 | 21 | 7 | 28 | 7 | 21 |
| EPR | — | — | — | — | — | — | — |
| Organic Peroxide | 0.3 | 0.3 | 0.3 | 0.3 | 0.3 | 0.3 | 0.3 |
| Crosslinking Aid | 0.5 | 0.5 | 0.5 | 0.5 | 0.5 | 0.5 | 0.5 |
| Second Mixing Zone | | | | | | | |
| PP | 50 | 50 | 30 | 70 | 20 | 10 | 40 |
| Crosslinked Product (1) | — | — | — | — | — | — | — |
| Crosslinked Product (2) | 30 | 40 | 40 | 20 | 40 | 80 | 10 |
| SEBS | — | — | — | — | — | — | 20 |
| Physical Properties | | | | | | | |
| MFR (g/10 min) | 9 | 9 | 7 | 12 | 7 | 7 | 11 |
| Flexural Modulus | | | | | | | |
| 23° C. (kg/cm$^2$) | 3030 | 3050 | 2800 | 7800 | 2400 | 2400 | 3000 |
| 80° C. (kg/cm$^2$) | 1250 | 1650 | 920 | 4600 | 760 | 880 | 1050 |
| Tensile Breaking Strength (kg/cm$^2$) | 142 | 145 | 95 | 260 | 83 | 88 | 110 |
| Tensile Breaking Elongation (%) | 640 | 620 | 670 | 310 | 680 | 670 | 710 |
| Izod Impact Strength room temperature (kg-cm/cm) | NB | NB | PB | NB | NB | NB | NB |
| −40° C. | NB | PB | NB | PB | NB | NB | NB |
| Shore Hardness (Shore-D) | 55 | 55 | 54 | 78 | 52 | 52 | 56 |
| Mouldability (Flow Marks) | O | O | O | O | Δ | Δ | O |
| Coatability (cross-cut tape-peeling test) | 100/100 | 100/100 | 100/100 | 100/100 | 100/100 | 100/100 | 100/100 |

Notes:
[1] Not Broken.
[2] Partly Broken.

EXAMPLE 16

In the same manner as Example 15, except that butyl rubber (IIR) was added to the second mixing zone, a thermoplastic resin composition was prepared. This was tested in the same manner as above, and the results obtained were shown in Table 2 below.

EXAMPLE 17

In the same manner as Example 15, except that linear low-density polyethylene (LLDPE) was added to the second mixing zone, a thermoplastic resin composition was prepared. This was tested in the same manner as above, and the results obtained are shown in Table 2 below.

TABLE 2

| Ingredients (wt. pts.) | Example No. | |
|---|---|---|
| | 16 | 17 |
| First Mixing Zone | | |
| PP | 9 | 9 |
| EPDM | 21 | 21 |
| Organic Peroxide | 0.3 | 0.3 |
| Crosslinking Aid | 0.5 | 0.5 |
| Second Mixing Zone | | |
| PP | 40 | 40 |
| Crosslinked Product (2) | 10 | 10 |
| IIR | 20 | — |
| LLDPE | — | 20 |
| Physical Properties | | |
| MFR (g/10 min) | 10 | 10 |
| Flexural Modulus 23° C. (kg/cm$^2$) | 2,900 | 3,200 |
| Flexural Modulus 80° C. (kg/cm$^2$) | 1,000 | 1,100 |
| Tensile Breaking Strength (kg/cm$^2$) | 105 | 125 |
| Tensile Breaking Elongation (%) | 620 | 610 |
| Izod Impact Strength Room Temperature (kg-cm/cm) | NB | NB |
| −40° C. | NB | NB |
| Shore Hardness (Shore-A) | 65 | 60 |

EXAMPLE 18

0.3 part by weight of organic peroxide (Perhexyne-2,5B) and 0.5 part by weight of crosslinking aid (divinylbenzene) were added to 9 parts by weight of polypropylene and 21 parts by weight of EPDM and well blended in a rotary mixer, and the resulting blend was fed into the first mixing zone of the extruder of FIG. 1. The reaction condition was the same as that in Example 1.

Subsequently, 54 parts by weight of polypropylene, 3 parts by weight of chlorinated butyl rubber, 8 parts by weight of EPDM, 5 parts by weight of mineral oil softening agent and additionally, as a crosslinking agent for the chlorinated butyl rubber, a mixture comprising 0.4 part by weight of ZnO, 0.2 part by weight of $ZnCl_2$ and 0.1 part by weight of MgO were fed into the second mixing zone, and the chlorinated butyl rubber was crosslinked in the zone. The thermoplastic resin composition thus obtained was tested in the same manner as Example 1. The results obtained are shown in Table 3.

EXAMPLE 19

In the same manner as Example 18, chlorinated butyl rubber was crosslinked in the second mixing zone. The same process as Example 18 was repeated except that the resin composition in the second mixing zone was varied to polypropylene/chlorinated butyl rubber/EPDM = 54/8/3 (parts by weight) and the crosslinking agent was varied to $ZnO/ZnCl_2/MgO = 1.2/0.6/0.3$ (parts by weight). The thermoplastic resin composition thus obtained was tested in the same manner as Example 1, and the results obtained are shown in Table 3.

TABLE 3

| Ingredients (wt. pts.) | Example No. 18 | Example No. 19 |
| --- | --- | --- |
| First Mixing Zone | | |
| PP | 9 | 9 |
| EPDM | 21 | 21 |
| Organic Peroxide | 0.3 | 0.3 |
| Crosslinking Aid | 0.5 | 0.5 |
| Second Mixing Zone | | |
| PP | 54 | 54 |
| CIIR | 3 | 8 |
| EPDM | 8 | 3 |
| Mineral Oil Softening Agent | 5 | 5 |
| ZnO | 0.4 | 1.2 |
| $ZnCl_2$ | 0.2 | 0.6 |
| MgO | 0.1 | 0.3 |
| Physical Properties | | |
| MFR (g/10 min) | 12 | 11 |
| Flexural Modulus 23° C. (kg/cm$^2$) | 3,200 | 3,250 |
| Flexural Modulus 80° C. (kg/cm$^2$) | 1,180 | 1,250 |
| Tensile Breaking Strength (kg/cm$^3$) | 140 | 140 |
| Tensile Breaking Elongation (%) | 620 | 640 |
| Izod Impact Strength Room Temperature (kg-cm/cm) | NB | NB |
| −40° C. | NB | NB |
| Shore Hardness (Shore-D) | 58 | 55 |
| Mouldability (Flow Marks) | 0 | 0 |
| Coatability (cross-cut tape-peeling test) | 100/100 | 100/100 |

COMPARATIVE EXAMPLE 1

Polypropylene, EPDM and Crosslinked Product (1) were blended so that the composition could be the same as the thermoplastic resin composition obtained in Example 1, and 0.3 part by weight of organic peroxide (Perhexyne-2,5B) and 0.5 part by weight of crosslinking aid (divinylbenzene) were added thereto and uniformly dispersed. Then the resulting dispersion was fed into the first mixing zone of the extruder. The residence time in the extruder was 60 seconds.

COMPARATIVE EXAMPLE 2

The same process as Comparative Example 1 was repeated except that the crosslinking agent was reduced to 0.1 part by weight and the crosslinking aid to 0.17 part by weight. The proportion of the resin components and the reaction condition were the same as those in Comparative Example 1.

COMPARATIVE EXAMPLE 3

Resin components were blended so that the final composition could be the same as that in Example 2, and 0.3 part by weight of crosslinking agent and 0.5 part by weight of crosslinking aid were uniformly dispersed therein. The resulting dispersion was mixed in accordance with the process of Comparative Example 1.

COMPARATIVE EXAMPLE 4

The same process as Comparative Example 1 was repeated except that the Crosslinked Product (1) was replaced by Crosslinked Product (2).

COMPARATIVE EXAMPLE 5

The resin components were the same as those in Comparative Example 4, but the crosslinking agent was reduced to 0.1 part by weight and the crosslinking aid to 0.17 part by weight. The mixture was mixed in the same manner as in Comparative Example 4.

COMPARATIVE EXAMPLE 6

The resin mixture as fed into the second mixing zone did not contain crosslinked product of chlorinated butyl rubber. The composition thus obtained was tested with respect to the properties thereof.

COMPARATIVE EXAMPLE 7

The resin components of polypropylene/EPDM = 55/45 (by weight) were crosslinked with only organic peroxide.

COMPARATIVE EXAMPLE 8

Polypropylene and EPDM were put in the first mixing zone in the proportion as indicated in Table 4 below and mixed for 60 seconds (residence time) at 200° C. Then polypropylene and Crosslinked Product (1) were incorporated into the blend in the proportion as indicated in Table 4 in the second mixing zone. In the same manner as Example 1, a thermoplastic resin composition was obtained.

COMPARATIVE EXAMPLE 9

The same process as in Comparative Example 8 was repeated except that 0.3 part by weight of organic peroxide and 0.5 part by weight of crosslinking aid were added to the second mixing zone, and a thermoplastic resin composition was obtained.

COMPARATIVE EXAMPLE 10

The resin components as indicated in Table 4 were mixed in the first mixing zone, and polypropylene, EPDM, organic peroxide and crosslinking aid were added to the resulting blend in the proportion as indicated in Table 4 in the second mixing zone. These were mixed therein to obtain a thermoplastic resin composition.

The thermoplastic resin compositions thus obtained in the above-mentioned Comparative Examples 1 to 10 were tested with respect to the physical properties as well as the mouldability and the coatability thereof. The results obtained are shown in Table 4.

TABLE 4

| Ingredients (wt. pts.) | Comparative Example No. | | | | | | | | | |
|---|---|---|---|---|---|---|---|---|---|---|
| | 1 | 2 | 3 | 4 | 5 | 6 | 7 | 8 | 9 | 10 |
| First Mixing Zone | | | | | | | | | | |
| PP | 59 | 59 | 56 | 59 | 59 | 9 | 55 | 9 | 9 | 50 |
| EPDM | 21 | 21 | 14 | 21 | 21 | 21 | 45 | 21 | 21 | — |
| Crosslinked Product (1) | 20 | 20 | 30 | — | — | — | — | — | — | 20 |
| Crosslinked Product (2) | — | — | — | 20 | 20 | — | — | — | — | — |
| Organic Peroxide | 0.3 | 0.1 | 0.3 | 0.3 | 0.1 | 0.3 | 0.3 | — | — | — |
| Crosslinking Aid | 0.5 | 0.17 | 0.5 | 0.5 | 0.17 | 0.5 | 0.5 | — | — | — |
| Second Mixing Zone | | | | | | | | | | |
| PP | — | — | — | — | — | 54 | — | 50 | 50 | 9 |
| EPDM | — | — | — | — | — | 11 | — | — | — | 21 |
| Mineral Oil Softening Agent | — | — | — | — | — | 5 | — | — | — | — |
| Crosslinked Product (1) | — | — | — | — | — | — | — | 20 | 20 | — |
| Organic Peroxide | — | — | — | — | — | — | — | — | 0.3 | 0.3 |
| Crosslinking Aid | — | — | — | — | — | — | — | — | 0.5 | 0.5 |
| Physical Properties | | | | | | | | | | |
| MFR (g/10 min) | 18 | 16 | 26 | 25 | 19 | 16 | 10 | 20 | 18 | 18 |
| Flexural Modulus | | | | | | | | | | |
| 23° C. (kg/cm$^2$) | 3300 | 3280 | 3210 | 3030 | 3090 | 2800 | 2000 | 2700 | 2900 | 2950 |
| 80° C. (kg/cm$^2$) | 1150 | 1180 | 1400 | 1020 | 1040 | 750 | 550 | 910 | 1600 | 1650 |
| Tensile Breaking Strength (kg/cm$^2$) | 105 | 120 | 115 | 96 | 110 | 110 | 85 | 90 | 102 | 98 |
| Tensile Breaking Elongation (%) | 420 | 510 | 410 | 320 | 490 | 660 | 650 | 650 | 630 | 620 |
| Izod Impact Strength room temp. (kg-cm/cm) | NB | NB | NB | NB | NB | NB | NB | NB | NB | NB |
| −40° C. | 25 | 38 | 22 | 18 | 40 | NB | NB | NB | NB | NB |
| Shore Hardness (Shore-D) | 58 | 57 | 57 | 54 | 54 | 52 | 48 | 45 | 48 | 48 |
| Mouldability (Flow Marks) | O | O | O | O | O | O | | O | O | O |
| Coatability (cross-cut take-peeling test) | 100/100 | 100/100 | 100/100 | 100/100 | 100/100 | 100/100 | 100/100 | 100/100 | 100/100 | 100/100 |

In accordance with the method for preparation of a thermoplastic resin composition of the present invention, as explained in detail above, a mixture containing a crosslinking olefin rubber is first crosslinked with an organic peroxide and then a mixture containing a halogenated butyl rubber is added thereto and is crosslinked with a metal oxide and/or metal chloride, or alternatively, the halogenated butyl rubber is crosslinked before being added. Accordingly, the crosslinkable olefin rubber may sufficiently be crosslinked while the halogenated butyl rubber may be crosslinked with the metal oxide and/or metal chloride without being decomposed by the organic peroxide. Thus a thermoplastic resin composition which is excellent in the mechanical strength, heat-resistance, impact-resistance, softness, mouldability and coatability may be obtained by the present invention.

As the thermoplastic resin composition obtained by the present invention is excellent in the above-mentioned properties, it is suitable for use in preparation of large-sized injection moulded articles, such as bumpers, air duct, door protector and the like car parts, as a substitute for polyurethane or polyester elastomers.

What is claimed is:

1. A method for preparation of a thermoplastic resin composition comprising from 80 to 60% by weight of a polyolefin and from 20 to 40% by weight of crosslinked olefin rubber and further comprising halogenated butyl rubber in an amount of from 5 to 30 parts by weight to 100 parts by weight of the total of said polyolefin and said crosslinked olefin rubber, characterized in that:
   (a) a first blend of polyolefin and crosslinkable olefin rubber are dynamically heat-treated in the presence of an organic peroxide to form a dynamically vulcanized composition, and
   (b) a polyolefin and halogenated butyl rubber and a crosslinking agent for said halogenated butyl are added to said first blend and dynamically heat-treated so as to crosslink said halogenated butyl rubber.

2. The method of claim 1, in which said polyolefin in said step (a) is 60% by weight or more on the basis of the total amount of the said thermoplastic resin composition.

3. The method of claim 1 in which said halogenated butyl crosslinking agent is selected from the group consisting of metal oxide, metal chloride and mixtures thereof.

4. The method of claim 3 in which said halogenated butyl is selected from the group consisting of chlorinated butyl, brominated butyl and mixtures thereof and said polyolefin is polypropylene.

5. The method for preparation of a thermoplastic resin composition comprising from 80 to 60% by weight of polyolefin and from 20 to 40% by weight of crosslinked olefin rubber and further comprising halogenated butyl rubber in an amount of from 5 to 30 parts by weight to 100 parts by weight of the total of said polyolefin and said crosslinked olefin rubber, characterized in that:
   (a) polyolefin and a crosslinkable olefin rubber are dynamically heat-treated in the presence of an organic peroxide to form a first dynamically vulcanized blend composition, and (b) in a separate operation, a second dynamically vulcanized blend composition comprising polyolefin and halogenated butyl rubber crosslinked with crosslinking agent for said halogenated butyl is prepared and added to the said first blend and mixed to disperse (a) and (b) in one another.

6. The method of claim 5, in which said second blend composition in said step (b) further comprises crosslinked olefin rubber in an amount of from 2 to 30% by weight on the basis of the total amount of the said thermoplastic resin composition.

7. The method of claim 5 in which said halogenated butyl crosslinking agent is selected from the group consisting of metal oxide, metal chloride and mixtures thereof.

8. The method of claim 7 in which said halogenated butyl is selected from the group consisting of chlorinated butyl, brominated butyl and mixtures thereof and said polyolefin is polypropylene.

9. The method of claim 5 or 6 in which said polyolefin in said step (a) is from 1 to 15% by weight on the basis of the total amount of the said thermoplastic resin composition.

* * * * *